(12) United States Patent
Yeh et al.

(10) Patent No.: US 7,855,791 B2
(45) Date of Patent: Dec. 21, 2010

(54) VIBRATION-RESISTANT INTERFEROMETRIC SCANNING SYSTEM AND METHOD THEREOF

(75) Inventors: Sheng-Lih Yeh, Taipei (TW); Liang-Chia Chen, Taipei County (TW); Shyh-Tsong Lin, Taipei (TW)

(73) Assignee: National Taipei University of Technology, Taipei (TW)

( * ) Notice: Subject to any disclaimer, the term of this patent is extended or adjusted under 35 U.S.C. 154(b) by 158 days.

(21) Appl. No.: 12/413,911

(22) Filed: Mar. 30, 2009

(65) Prior Publication Data

US 2010/0033733 A1 Feb. 11, 2010

(30) Foreign Application Priority Data

Aug. 5, 2008 (TW) .............................. 97129701 A

(51) Int. Cl.
*G01B 11/02* (2006.01)
(52) U.S. Cl. ........................................ 356/511; 356/497
(58) Field of Classification Search ................. 356/479, 356/497, 511, 512
See application file for complete search history.

(56) References Cited

U.S. PATENT DOCUMENTS

| | | |
|---|---|---|
| 5,589,938 A | 12/1996 | Deck |
| 5,999,263 A | 12/1999 | Deck et al. |
| 6,624,894 B2 | 9/2003 | Olszak et al. |
| 2005/0237535 A1 | 10/2005 | Deck |
| 2009/0207416 A1* | 8/2009 | Xiangqian et al. .......... 356/477 |

* cited by examiner

*Primary Examiner*—Patrick J Connolly
(74) *Attorney, Agent, or Firm*—Tim Tinkang Xia; Morris, Manning & Martin, LLP

(57) ABSTRACT

A vibration-resistant interferometric scanning system and method are provided in the present invention. In the present invention, the brightness distribution in a high-coherence interference pattern is analyzed so as to perform a compensation action to lock the brightness distribution of a high-coherence interference pattern and consequently locking the fringe distribution of a low-coherence interference pattern or to perform a scanning operation composed of plural shifting actions with specified scanning distances in sequence and plural compensation actions to lock the fringe distribution in a low-coherence interference pattern corresponding to the surface profile of a measured object. Consequently, with the system and method of the present invention, the surface profile of a measured object disturbed by external or internal vibrations can be measured accurately and precisely.

18 Claims, 11 Drawing Sheets

VIBRATION-RESISTANT INTERFEROMETRIC SCANNING SYSTEM AND METHOD THEREOF

FIELD OF THE INVENTION

The present invention relates to an interferometric scanning technique for measuring the surface profile of a vibrating object, and more particularly, to a vibration-resistant interferometric scanning system and method capable of using the brightness distribution of a high-coherence interference pattern to assist the measurement of the surface profile of a vibrating object.

BACKGROUND OF THE INVENTION

Conventional low-coherent interferometry can only perform well when it is used under the help of good anti-vibration devices so that it can use an interferometric scanning technique to find different groups of surface points respectively on different vertical scanning levels to precisely measure the surface profile of a static object. However, although using anti-vibration devices is very efficient in reducing the vibration amplitude of a measured object affected by environmental disturbance such as structure vibration, air turbulence or acoustic instability, it still remains difficult to make the measured object completely static. As such interferometric scanning is often performed in site for production lines to fabricate precision parts, such as micro-electro-mechanical system (MEMS) components, IC wafers, or LCD panels, and the performance of such interferometric scanning is inevitably affected by environmental vibrations. Thus, an improved low-coherent interferometry using interferometric scanning techniques to measure the surface profile of an object suffering environmental disturbance is prominently needed.

Please refer to FIG. 1, which shows the way a conventional low-coherent interferometry is performed. In FIG. 1, an interferometric objective 11 contains a beam splitter 111, by which a downward beam incident into the interferometric objective 11 is divided into a downward transmissive beam and a upward reflected beam. Thereafter, the upward reflected beam is reflected back to the beam splitter 111 to form a reference beam by a reflective layer 113 coated at a small area on a transparent substrate 112 in the interferometric objective 11 while the downward transmissive beam is projected on the surface of a measured object 12 and is scattered to form a scattered field. A part of the scattered field is projected back to the interferometric objective 11 to form an object beam and is combined with the reference beam by the beam splitter 111 to form an upward interference field used for forming an interference pattern. When the light used to form an interference pattern is a high-coherent one, all local areas in the interference pattern can be clear (focused and with a reasonable contrast). However, when the light used to form an interference pattern is a low-coherent one, only some local areas in the interference pattern can be clear and other local areas can't. Moreover, when the reference beam is a plane wave, all the object surface points on a flat plane 13 make their corresponding local areas in the object beam have almost the same optical path as the reference beam after the reference beam and the object beam are combined by the beam splitter 111. Therefore, all interference fringes in the low-coherence interference pattern disclose that all the object surface points corresponding to these fringes are on the plane 13.

When a conventional low-coherent interferometric scanning technique is used for measuring the surface profile of a static object 12, the distance s between the datum plane 15 of the interferometric objective 11 and the datum plane 16 of the measured object 12 can be easily controlled to be a specified value. It noted that the distance L between the datum plane 15 and the plane 13 is constant. When the interferometric objective 11 goes upward by a distance $z_u$ (i.e. the datum plane 15 goes upward by $z_u$), the plane 13 also goes upward by $z_u$. When the interferometric objective 11 goes downward by a distance $z_d$, the plane 13 goes downward by $z_d$ as well. Therefore, by changing the position of the interferometric objective 11 (scanning), the plane 13 can in turn intersect with different levels on the surface of the measured object 12 to form corresponding interference patterns. Because the differences for the distances s for forming all the interference patterns may be known in advance, the surface profile of the measured object 12 can be derived by analyzing the interferences on the interference patterns.

When a conventional low-coherent interferometric scanning technique is used to measure the surface profile of an object while the measured object is disturbed by vibrations or other environmental disturbances, the distance s(t) between the datum plane 15 of the interferometric lens and the datum plane 16 of the measured object 12 can't be easily controlled to be a specified value because it depends on time t. By changing the position of the interferometric objective 11 (i.e. performing a scanning operation), the plane 13 can in turn intersect with different levels on the surface of the measured object 12 to form interference patterns. Because the setup is disturbed by vibrations, the distance s(t) for forming every interference pattern becomes time-variant and unpredictable. The surface profile of the measured object 12 can't be derived by analyzing the interferences on the interference patterns until the distance s(t) for forming every interference pattern is measured or the differences for the distances s(t) for forming all the interference patterns become known. For deriving the distance s(t), it can be obtained by directly measuring the distance between the datum plane 15 of the interferometric objective 11 and the datum plane 16 of the measured object 12, or it can be obtained by the following process: obtaining a distance a(t) between an environment datum level 14 and the datum plane 15; obtaining another distance b(t) between the environment datum level 14 and the datum plane 16 of the measured object; and then obtaining the distance variation s(t) by the formula: s(t)=b(t)−a(t). Similarly, the difference of two distances s(t) can be derived by subtracting the difference of two distances a(t) from the difference of two distances b(t).

There are four U.S. patents (Pub. No. 1996/5589938, Pub. No. 1999/5999263, Pub. No. 2003/6624894, and Pub. No. 2005/0237535) that disclose related methods to measure the differences between the distances s(t) for forming all the interference patterns. All the methods detect the actual displacement of the measured object or the interferometric objective to derive the changes of s(t). Therefore, all the above-mentioned published patents measure the instant distance s(t) for forming each of interference patterns and the interference patterns are formed from non-uniform increments (caused by vibrations) for the distance s(t). However, the distance s(t) for forming each of interference patterns can be fixed to be a specified value s that is not affected by vibrations and the interference patterns can be formed from uniform increments (achieved by vibration-resistant capability) for the distance s when the method proposed in this patent is used.

SUMMARY OF THE INVENTION

The object of the present invention is to provide a vibration-resistant interferometric scanning system and method for measuring the surface profile of a vibrating object, that are capable of performing a compensation action to lock the brightness distribution of a high-coherence interference pattern and consequently locking the fringe distribution of a low-coherence interference pattern or capable of using the brightness distribution of a high-coherence interference pattern to perform a scanning operation composed of plural shifting actions with specified shifting distances in sequence and plural compensation actions to lock the fringe distribution of a low-coherence interference pattern corresponding to the surface profile of the measured vibrating object after each of the shifting actions is performed.

It is another object of the invention to provide a vibration-resistant interferometric scanning system and method for measuring the surface profile of a vibrating object, which is capable of using the ratio between the brightness values of two specified pixels in a high-coherent interference pattern, or using the position of the pixel with the local-maximal or local-minimal brightness value for a specified line that contains at least three continuous pixels in a high-coherent interference pattern to lock the fringe distribution of a low-coherence interference pattern and also to rapidly change the scanning level for a measured object in a low-coherent interferometric shifting action. Here, the locking of the fringe distribution is used to make the image of the low-coherence interference pattern clear and the change of the scanning level is used to operate an interferometric scanning technique for the vibrating object in a manner similar to an interferometric scanning for a static object.

It is yet another object of the invention to provide a vibration-resistant interferometric scanning system and method, adapted for performing a surface profile measurement upon a measured object disturbed by external or internal vibrations, by that the variation of the distance between an interferometric objective and a measured vibrating object can be detected by analyzing the change of the brightness distribution of a high-coherent interference pattern, and then the position of the interference objective or that of the measured object can be adjusted in a real-time manner to compensate the distance variation and thus keep the distance between the interferometric objective and the measured vibrating object at a fixed value.

In an exemplary embodiment, the present invention provides a vibration-resistant interferometric scanning system, which comprises: a light source module; an optics module, for receiving a light beam generated from the light source module so as to form respectively a high-coherent interference pattern and a low-coherent interference pattern corresponding to the surface profile of a measured object; and a control unit, capable of performing a compensation action to lock the brightness distribution of a high-coherence interference pattern and consequently locking the fringe distribution of a low-coherence interference pattern. In another embodiment, the control unit is designed to perform a scanning operation composed of plural processes and every process comprising the following steps: performing a shifting action with a specified shifting distance; basing upon the specified shifting distance, the wavelength of the light forming the high-coherent interference pattern, and the brightness distribution of the high-coherent coherent interference pattern before the shifting action to perform a compensation action to lock the brightness distribution of the high-coherent interference pattern soon after the shifting action is completed and consequently to lock the fringe distribution of the low-coherence interference pattern after the shifting action is locked.

In an exemplary embodiment, the present invention provides a vibration-resistant interferometric scanning method, comprising a compensation operation composed of the following steps of: forming respectively a high-coherent interference pattern and a low-coherent interference pattern corresponding to the surface profile of a measured object; and performing a compensation action to lock the brightness distribution of the high-coherent interference pattern and consequently locking the fringe distribution of the low-coherence interference pattern.

In an exemplary embodiment, the present invention provides a vibration-resistant interferometric scanning method, comprising a scanning operation composed of plural processes and every process being performed according to the steps of: forming respectively a high-coherent interference pattern and a low-coherent interference pattern corresponding to the surface profile of a measured object; performing a shifting action with a specified shifting distance; basing upon the specified shifting distance, the wavelength of the light field forming the high-coherent interference pattern, and the brightness distribution of the high-coherent interference pattern before the shifting action to perform a compensation action to lock the brightness distribution of the high-coherent interference pattern soon after the shifting action is completed and consequently locking the fringe distribution of the low-coherence interference pattern after the shifting action.

Further scope of the applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 1:
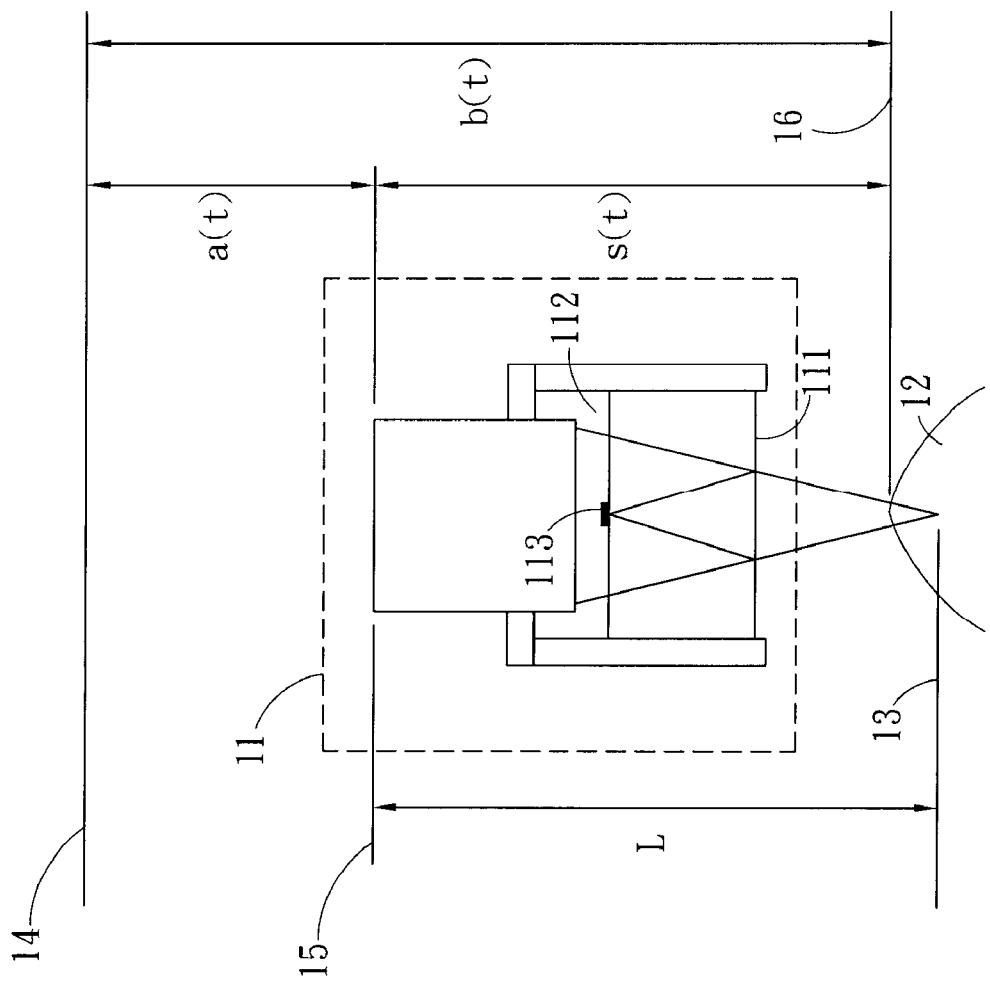
FIG. 1 is a schematic diagram showing the way a conventional low-coherent interferometry is performed.
Figure 2A:
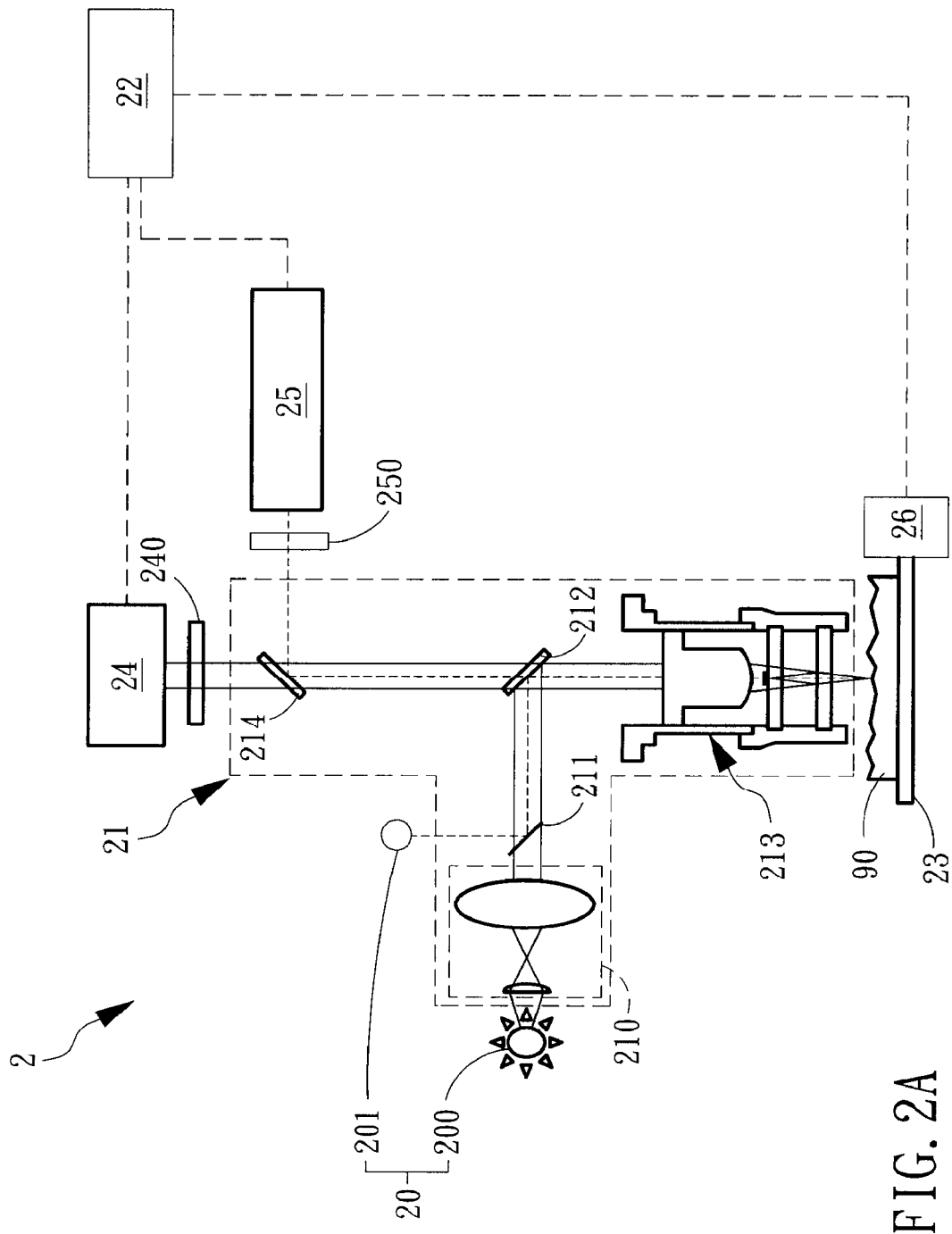
FIG. 2A is a schematic diagram showing a vibration-resistant interferometric scanning system according to a first embodiment of the invention.

Please refer to FIG. 2A, which is a schematic diagram showing a vibration-resistant interferometric scanning system according to a first embodiment of the invention. In this embodiment, the vibration-resistant interferometric scanning system 2 comprises a light source module 20, an optics module 21, and a control unit 22. The light source module 20 is composed of a low-coherent light source 200 and a high-coherent light source 201, in which the low-coherent light source 200 for providing a low-coherent inspection beam that can be a white light source but is not limited thereby; and the high-coherent light source 201 for providing a high-coherent inspection beam that can be a laser but also is not limited thereby. The optics module 21 is designed to receive both the low-coherent inspection beam and the high-coherent inspection beam generated from the light source module 20 for respectively forming a high-coherent interference pattern and a low-coherent interference pattern corresponding to the surface profile of a measured object 90. In this embodiment, the optics module 21 comprises a lens set 210, a first beam splitter 211, a second beam splitter 212, an interferometric objective 213, and a third beam splitter 214, in which the lens set 210 is used for guiding the low-coherent inspection beam to travel toward the first beam splitter 211, where the low-coherent inspection beam is combined with the high-coherent inspection beam to form a combined light field. The combined light field is reflected by the second beam splitter 212 and passes the interference objective 213 to focus on the measured object 90 disposed on a platform 23. Thereafter, the low-coherent component light in the combined light field is reflectively scattered by the measured object 90 to form a low-coherent object beam that travels back to the interferometric objective 213, where it is combined with a low-coherent reference beam created in the interferometric objective 213 so as to form a low-coherent interference beam, and then the low-coherent interference beam is projected toward a first image-grabbing device 24 by passing through the third beam splitter 214 to form a low-coherent interference pattern. Moreover, the high-coherent component light in the combined light field is reflectively scattered by the measured object 90 to form a high-coherent object beam that travels back to the interferometric objective 213, where it is combined with a high-coherent reference beam created in the interferometric objective 213 so as to form a high-coherent interference beam, and then the high-coherent interference beam is projected toward a second imaging device 25 by being reflected by the third beam splitter 214 to form a high-coherent interference pattern.

In addition, there are two filters 240 and 250 arranged respectively in front of the first and the second image-grabbing devices 24 and 25, by that potential noises in the low-coherent interference beam and the high-coherent interference beam can be filtered out so as to ensure the clearness of the two interference patterns. Moreover, in this embodiment, the wavelength range of the high-coherent light should not overlap with that of the low-coherent light to prevent the two lights interfering with each other in the two image-grabbing devices 24 and 25. The control unit 22 can perform a compensation action to lock the brightness distribution of the high-coherent interference pattern and consequently the fringe distribution of the low-coherence interference pattern is locked; or it can perform a scanning operation composed of plural processes and every process is performed in a manner that the control unit 22 first performs a shifting action with a specified shifting distance, and then basing upon the specified shifting distance, the wavelength of the light forming the high-coherent interference pattern, and the brightness distribution of the high-coherent coherent interference pattern acquired before the shifting action to lock the brightness distribution of the high-coherent interference pattern after the shifting action is completed so that the fringe distribution of the low-coherence interference pattern after the shifting action is locked. In this embodiment, there is a displacement unit 26 arranged beside the platform 23, which is under the supervision of the control unit 22 used to adjust the position of the measured object 90 or the interferometric objective 213.

Figure 3:
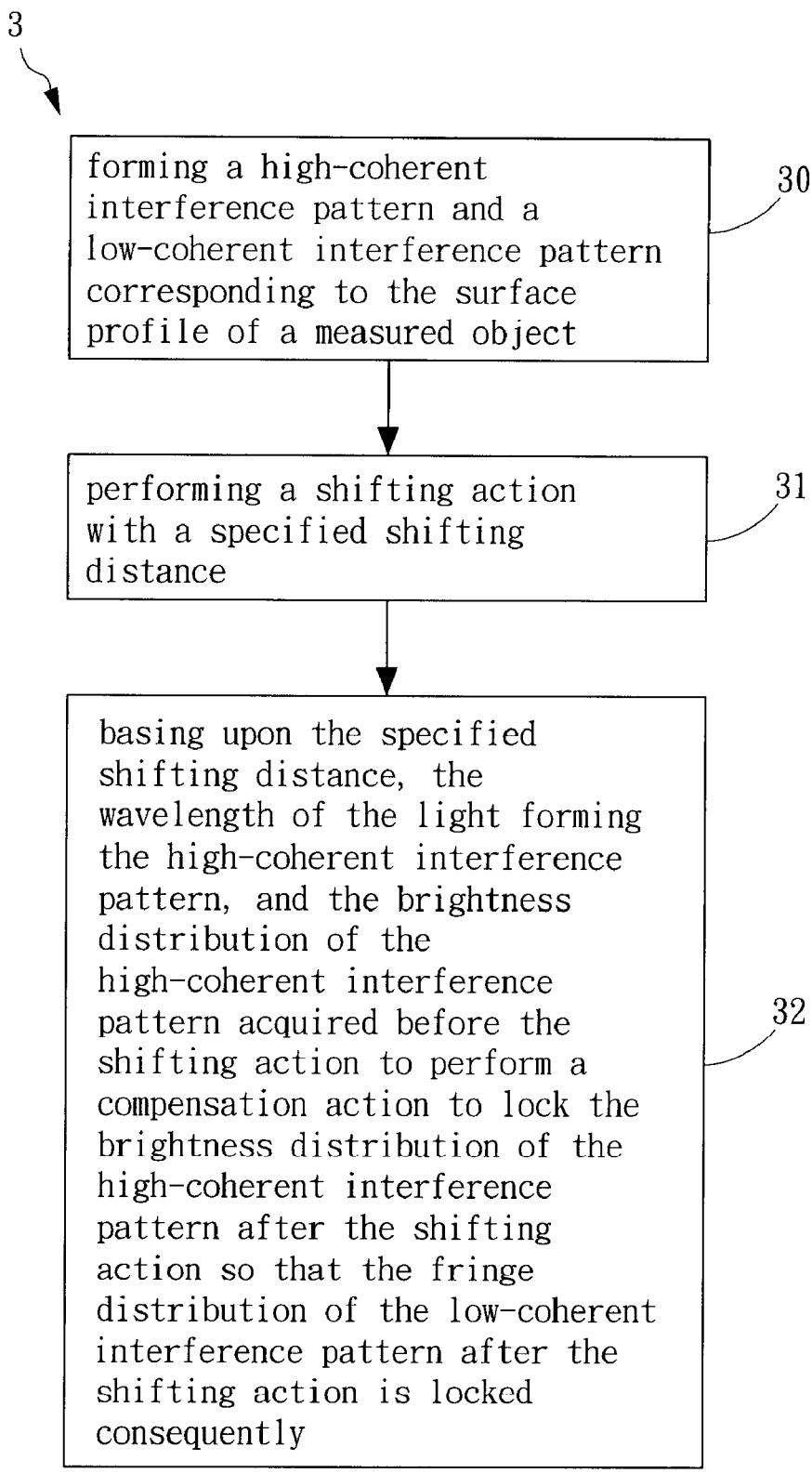
FIG. 3 is a flow chart depicting the steps of each process in the scanning operation for a vibration-resistant interferometric scanning method according to an embodiment of the invention.

Please refer to FIG. 3, which is a flow chart depicting the steps of each process in the scanning operation for the vibration-resistant interferometric scanning method according to an embodiment of the invention. The process 3 starts from step 30. At step 30, a high-coherent interference pattern and a low-coherent interference pattern corresponding to the surface profile of a measured object are formed respectively; and then the flow proceeds to step 31. It is noted that the two aforesaid interference patterns are acquired by the first and the second image-grabbing devices 24 and 25 respectively. At step 31, a shifting action with a specified shifting distance is performed, where the specified shifting distance is the distance change between the interferometric objective 213 and the measured object 90. After the shifting action, it is noted that the distance between the interferometric objective 213 and the measured object 90 is obviously affected by the disturbance from external or internal vibration sources so that it is required to have a compensation mechanism for keeping the distance between the interferometric objective 213 and the measured object 90 and thus preventing the low-coherent interference pattern acquired after the shifting action from being affected by the disturbance. Therefore, the flow proceeds to step 32. At step 32, basing upon the specified shifting distance, the wavelength of the light forming the high-coherent interference pattern, and the brightness distribution of the high-coherent interference pattern before the shifting action, the control unit is used to perform a compensation action to lock the brightness distribution of the high-coherent interference pattern when the shifting action is completed so that the fringe distribution of the low-coherence interference pattern after the shifting action is locked.

About the reference beam and the object beam (include the inspection beam), they travel along the same optical path both before they are split and after they are combined by the beam splitter in the interferometric objective, and they travel along different optical paths only from their splitting to their combination. It is noted that the optical path difference $\gamma$ between of the reference beam and the object beam (include the inspection beam) is changed with the change $\Delta h$ of the distance h between the interferometric objective and the measured object. The change $\Delta\gamma$ of the optical path difference $\gamma$ is determined according to the formula: $\Delta\gamma=2\Delta h=2d$. In the aforesaid formula, the factor 2 is added because the object beam travels back and forth between the interferometric objective and the measured object; d represents the specified shifting distance in a shifting action. Thus, when the specified shifting distance is defined as $d=\lambda/2$ while $\lambda$ is the wavelength of the light used for forming the high-coherent interference pattern, the change of the phase difference between the reference beam and the object beam is 360 degrees and thus the positions of the bright fringes and the dark fringes in the high-coherent interference pattern after the shifting action are the same as the positions of the bright fringes and the dark fringes in the high-coherent interference pattern before the shifting action respectively, i.e. the fringe distribution remains unchanged. Moreover, when the specified shifting distance is defined as $d=\lambda/4$, the phase difference between the reference beam and the object beam is 180 degrees, and thus the positions of the bright fringes and the dark fringes in the high-coherent interference pattern after the shifting action are exactly the positions of the dark fringes and the bright fringes in the high-coherent interference pattern before the shifting action respectively, i.e. the fringe distribution is inversed. Similarly, as it is noted that the change of the phase difference between the reference beam and the object beam is 90 degrees when the specified shifting distance is defined as $d=\lambda/8$, the positions of the bright fringes and the dark fringes after the shifting action can be obtained by calculation. Thus, according to the fringe distribution in the high-coherent interference pattern before the shifting action, the wavelength $\lambda$, and the specified shifting distance d, the fringe distribution after the shifting action can be known in advance by computation.

It is noted that the performance of the shifting action can be obviously affected by external or internal vibrations so that it is required to have a compensation action for fixing the distance between the interferometric objective and the measured object at a specified value and thus preventing the low-coherent interference pattern after the scanning operation from being affected by vibrations. The compensation action is performed according to the brightness values of plural specified pixels in the high-coherent interference pattern.

Figure 4B:
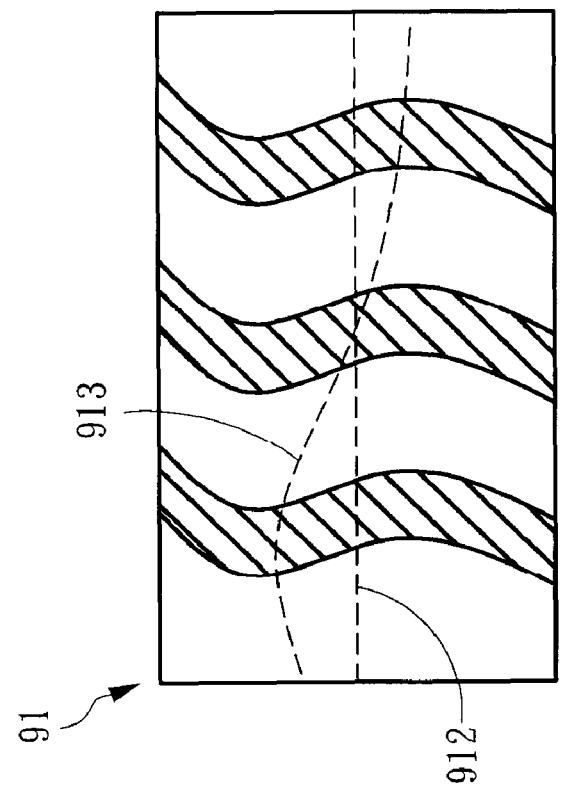
FIG. 4B is a schematic diagram showing the sampling path in a high-coherent interference pattern according to an embodiment of the invention.
Figure 4A:
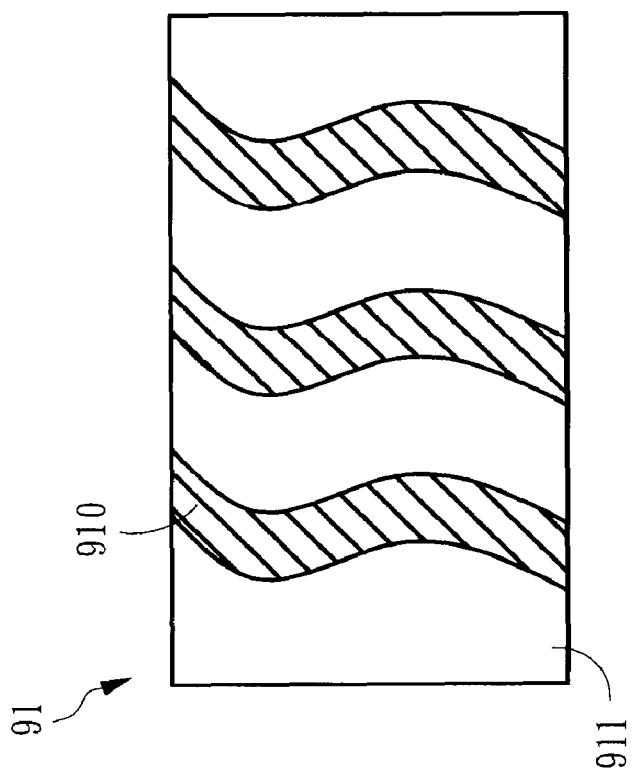
FIG. 4A is a schematic diagram showing a high-coherent interference pattern.

Please refer to FIG. 4A, which is a schematic diagram showing a high-coherent interference pattern. In FIG. 4A, the shadowed area 910 is a bright fringe and the non-shadowed area 911 is a dark fringe. The interference pattern in FIG. 4A is a pattern composed of interference fringes, but it is not limited thereby as it can be a pattern composed of speckles. Therefore, the brightness distribution, not limited to the fringe distribution, in the high-coherent interference pattern is used to identify the change of the distance between an interferometric object and a measured object in this patent. As shown in FIG. 4B, the sampling path in the high-coherent interference pattern can be either a straight line 912 or a curve 913.

Figure 6A:
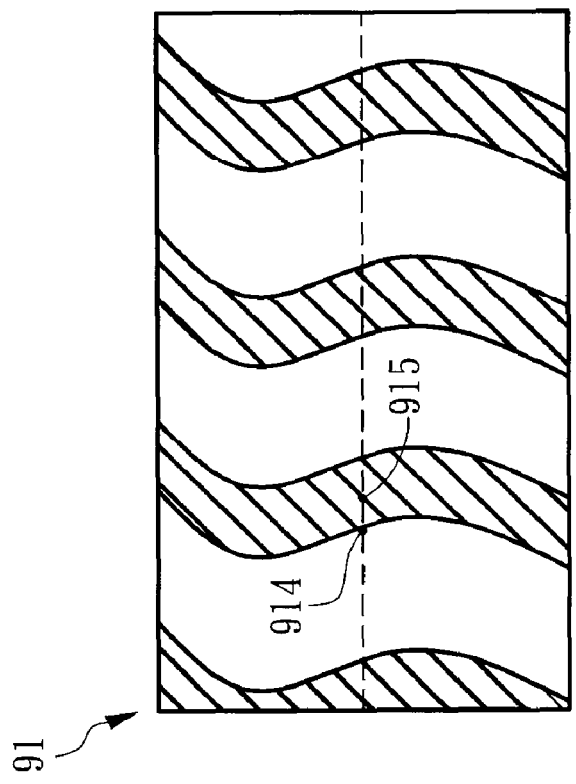
FIG. 6A and FIG. 6B are schematic diagrams depicting two specified pixels in a high-coherent interference pattern.

There are two types of compensation actions for fixing the distance between the interferometric objective and the measured object. One type is performed according to the brightness ratio between two specified pixels in the high-coherent interference pattern, and another type is performed according to the position of the local-brightest or local-darkest pixel for a specified line that contains at least three continuous pixels in the high-coherent interference pattern. About the first type, please refer to FIG. 6A and FIG. 6B, which are schematic diagrams depicting two specified pixels 914 and 915 in a high-coherent interference pattern. In FIG. 6A, the brightness ratio between the two specified pixels 914 and 915 obtained at a first time is $G_1/G_2$. It is supposed that there is disturbance caused by vibrations during the shifting action and thus the interference fringes in the high-coherent interference pattern will be affected thereby to shift, so that the brightness ratio between the two specified pixels 914 and 915 obtained at a second time may be different from that obtained at the first time.

Figure 6B:
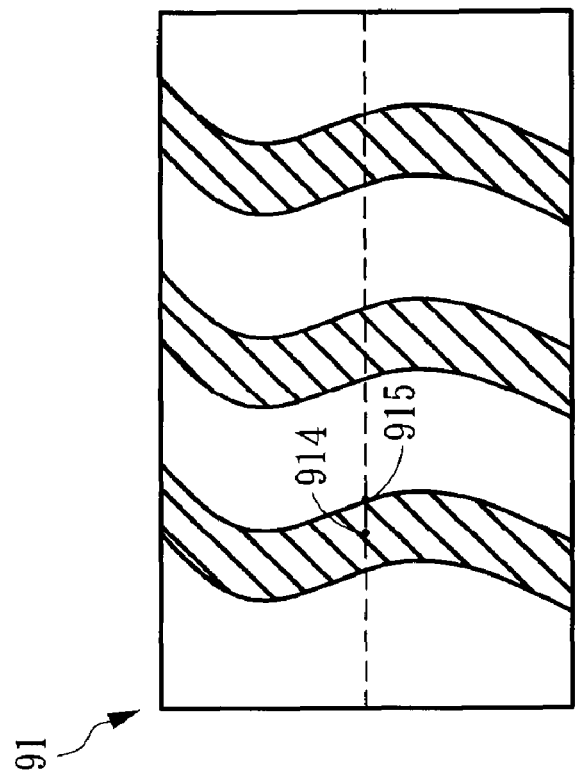

The displaced the interference fringes are shown in FIG. 6B. It is notable that the brightness ratio $G_1'/G_2'$ between the two specified pixels 914 and 915 obtained at the second time is different from brightness ratio $G_1/G_2$ obtained at the first time. Consequently, the control unit 22 controls the displacement unit 26 to drive the platform 23 to move rapidly so as to compensate the difference between $G_1'/G_2'$ and $G_1/G_2$. For instance, when $G_1'/G_2'<G_1/G_2$, it represents that interference fringes displace rightward and thus the control unit 22 must rapidly control the displacement unit 26 to drive the platform 23 to move the interference fringes back to their original positions (i.e. compensating the fringe displacement) as in FIG. 6A. Then the brightness ratio between the two specified pixels 914 and 915 will become $G_1/G_2$ again. By repeating the aforesaid comparison for the two brightness ratios $G_1/G_2$ and $G_1'/G_2'$ and performing the compensation operations in a rapid manner, the distance between the interferometric objective 213 and the measured object 90 can be fixed. As the compensation action is performed to eliminate the displacement of the interference fringes, the effectiveness of the compensation action can be measured according to the how much the interference fringes are displaced away from where they are supposed to be. Therefore, the compensation action makes the shifting distance of a shifting action accurate and it is not necessary to measure the distance between the interferometric objective 213 and the measured object 90 or the change of the distance.

For another compensation action type performed according to at least three continuous pixels, it is performed as follows: first, at least three continuous pixels on a sampling path are selected for acquiring their brightness values thereof, and then the position of the local-darkest or local-brightest pixel among the specified pixels is detected. The sampling path is shown in FIG. 7A. Assume that the brightness values of the N continuous pixels between two specified pixels 916 and 917 at a first time are $G_1, G_2, \ldots, G_N$. In this embodiment, the local-brightest pixel is the pixel 918. When the measured object is disturbed, the interference fringes in the high-coherent interference pattern obtained at a second time is displaced as that shown in FIG. 7B, and the brightness values of the N continuous pixels between the two specified pixels 916 and 917 at the second time are $G_1', G_2', \ldots, G_N'$. Thus the pixel 919 becomes the local-brightest pixel. Consequently, the control unit 22 controls the displacement unit 26 for driving the platform 23 to move rapidly so as to make the pixel 918 become the local-brightest pixel again. By repeating the aforesaid comparison for the positions of the pixels 918 and 919 and performing the compensation in a rapid manner, the distance between the interferometric objective 213 and the measured object 90 can be maintained. Moreover, the compensation action makes the shifting distance of a shifting action accurate and it is not necessary to measure the distance between the interferometric objective 213 and the measured object 90 or the change of the distance.

Figure 5:
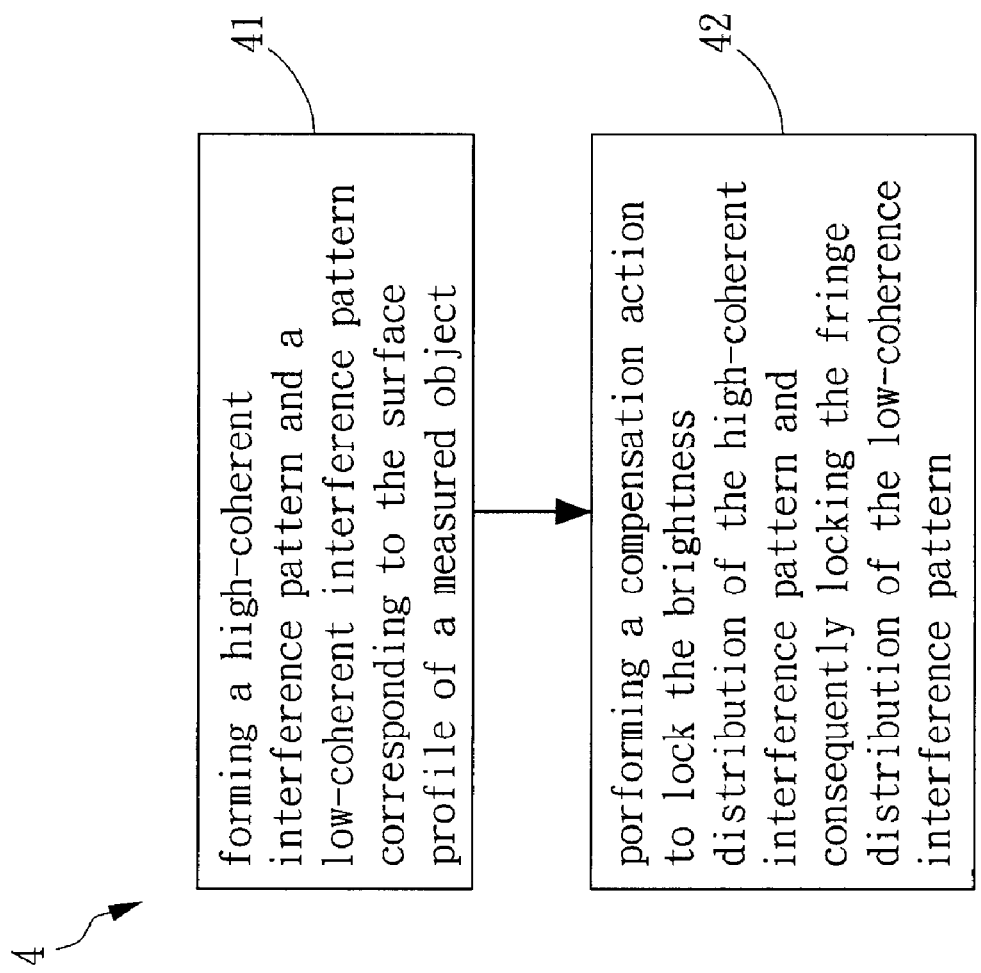
FIG. 5 is a flow chart depicting the steps of the compensation operation for a vibration-resistant interferometric scanning method according to an embodiment of the invention.

Please refer to FIG. 5, which is a flow chart depicting the steps of the compensation operation for a vibration-resistant interferometric scanning method according to an embodiment of the invention. The compensation operation 4 starts from step 41. At step 41, a high-coherent interference pattern and a low-coherent interference pattern corresponding to the surface profile of a measured object are formed respectively; and then the flow proceeds to step 42. It is noted that the two aforesaid interference patterns are acquired by the first and the second image-grabbing devices 24 and 25, respectively. At step 42, a compensation action is performed to lock the brightness distribution of the high-coherent interference pattern and consequently the fringe distribution of the low-coherent interference pattern is locked. The compensation action in step 42 is similar to that in step 32 described in FIG. 3, but is different in that: the compensation action in step 42 is performed according to the brightness distribution of the high-coherent interference pattern acquired directly (there is no shifting action for this case), while the compensation in step 32 is performed according to the calculated brightness distribution acquired after a shifting action by referencing to the high-coherent interference pattern acquired before the shifting action.

Figure 2B:
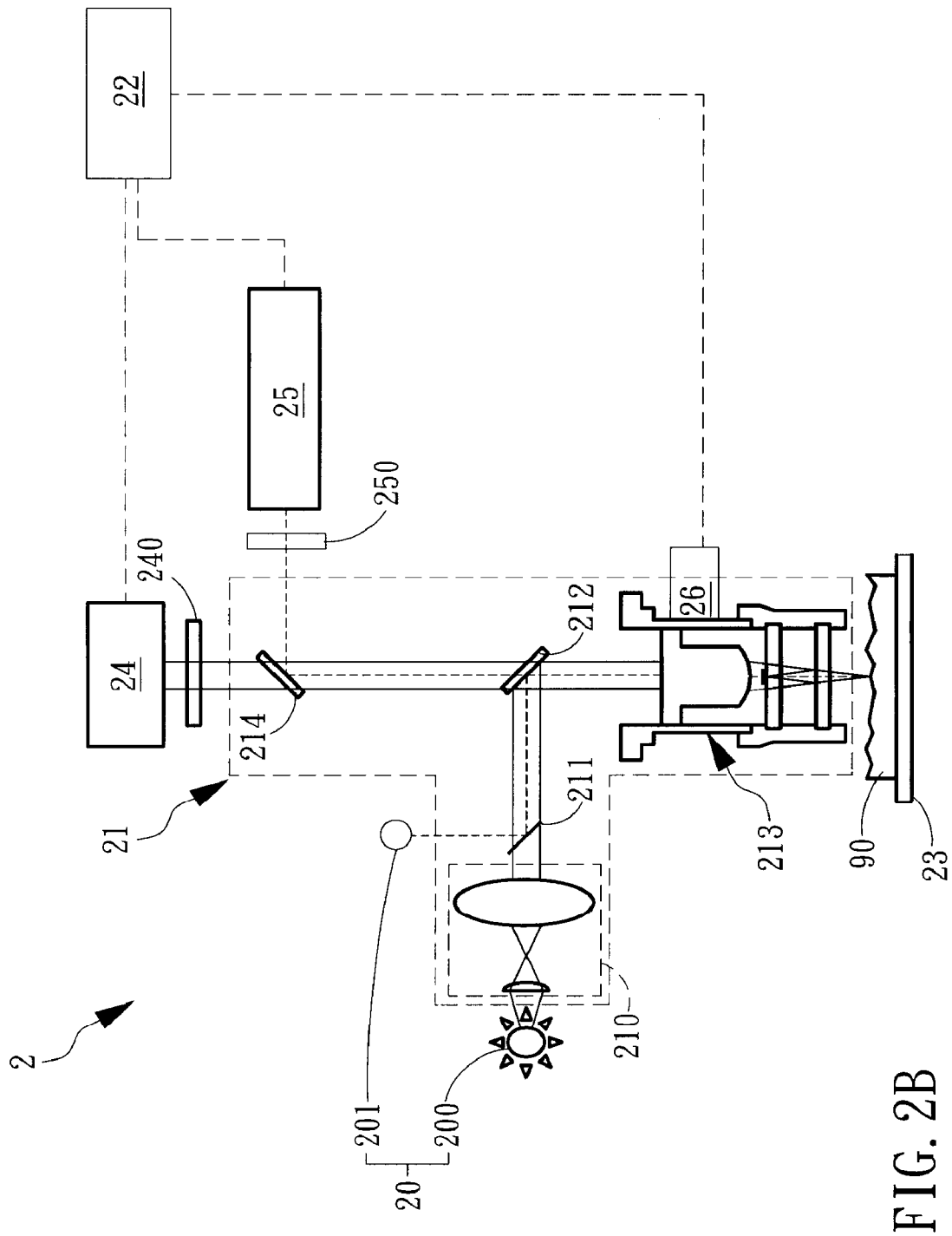
FIG. 2B is a schematic diagram showing a vibration-resistant interferometric scanning system according to a second embodiment of the invention.
Figure 7B:
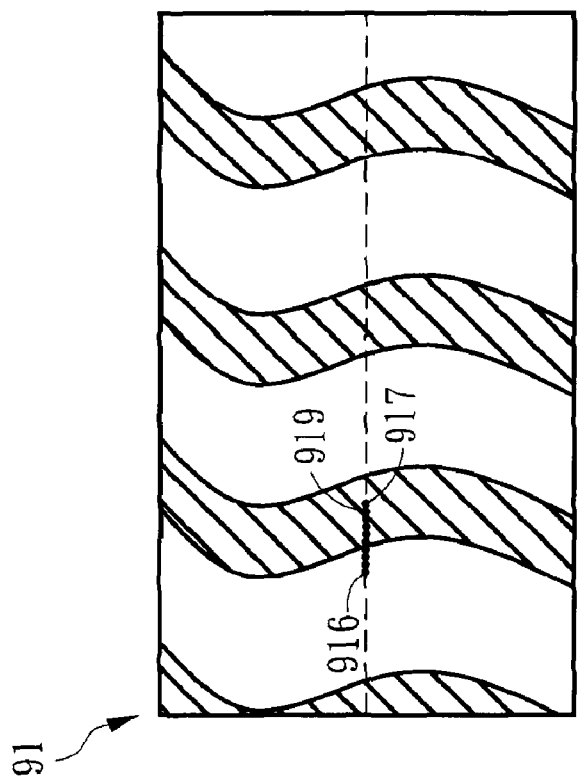
FIG. 7A and FIG. 7B are schematic diagrams depicting at least three specified continuous pixels in a high-coherent interference pattern.
Figure 7A:
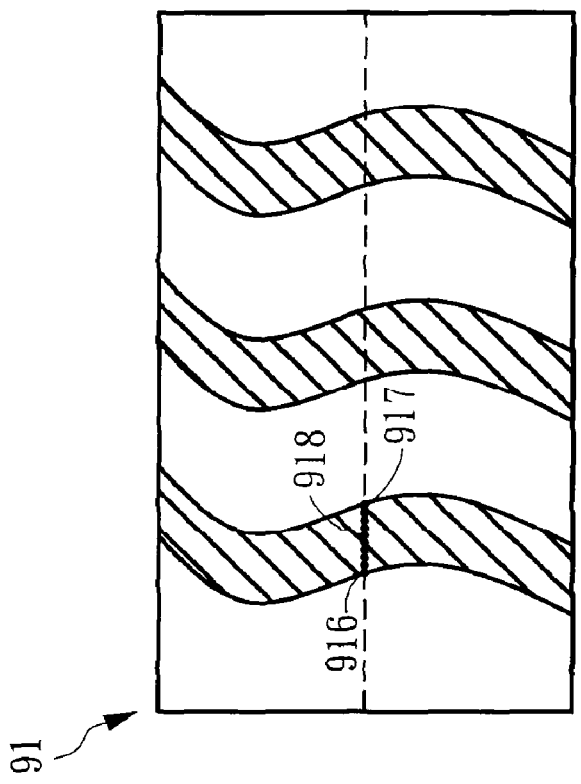

From the descriptions relating to FIG. 6A and FIG. 6B and those relating to FIG. 7A and FIG. 7B, it is noted that both the compensation action according to the brightness ratio of two specified pixels and the compensation action according to the position of the local-darkest or local-brightest pixel among at least three continuous pixels are designed to fix the distance between the interferometric objective and the measured object. In the apparatus shown in FIG. 2A, the locking is performed by moving the measured object and thus the distance between the interferometric objective and the measured object can be fixed. Please refer to FIG. 2B, which is a schematic diagram showing a vibration-resistant interferometric scanning system according to a second embodiment of the invention. In the embodiment shown in FIG. 2B, the system is similar to that shown in FIG. 2A, but is different in that: the displacement unit 26 is coupled to the interferometric objective 213, instead of the platform 23. Thereby, the displacement unit 26 can drive the interferometric objective 213 to move so as to maintain the distance between the interferometric objective and the measured object.

Figure 8:
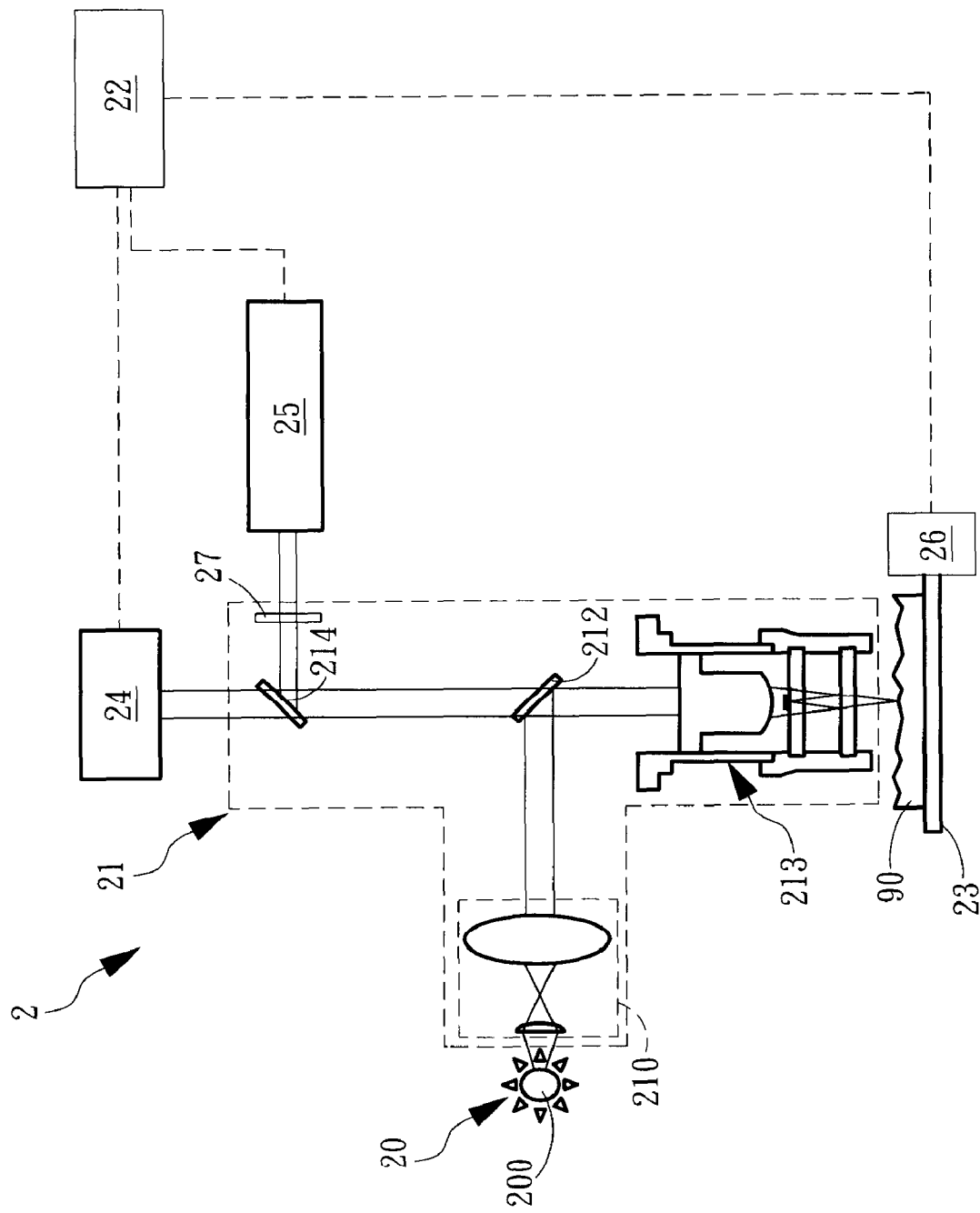
FIG. 8 is a schematic diagram showing a vibration-resistant interferometric scanning system according to a third embodiment of the invention.

Please refer to FIG. 8, which is a schematic diagram showing a vibration-resistant interferometric scanning system according to a third embodiment of the invention. The vibration-resistant interferometric scanning system of FIG. 8 is similar to the one shown in FIG. 2A, but is different in that: its optics module is comprised of only a low-coherent light source 200 that there is no high-coherent light source; and further there is an additional narrow-band filter 27 arranged between the third beam splitter 214 and the second image-grabbing device 25. In the system, the low-coherent light generated from the low-coherent light source 200 is incident on the interferometric objective 213 to form a low-coherent object beam. Moreover, a part of the low-coherent interference field passes the third beam splitter 214 to be received by the first image-grabbing device 24 while the rest of the low-coherent interference field is reflected by the third beam splitter 214 and thus passes the narrow-band filter 27 to be filtered to become a high-coherent interference field. Then the high-coherent interference field is acquired by the second image-grabbing device 25 to form a high-coherent interference pattern.

Figure 9:
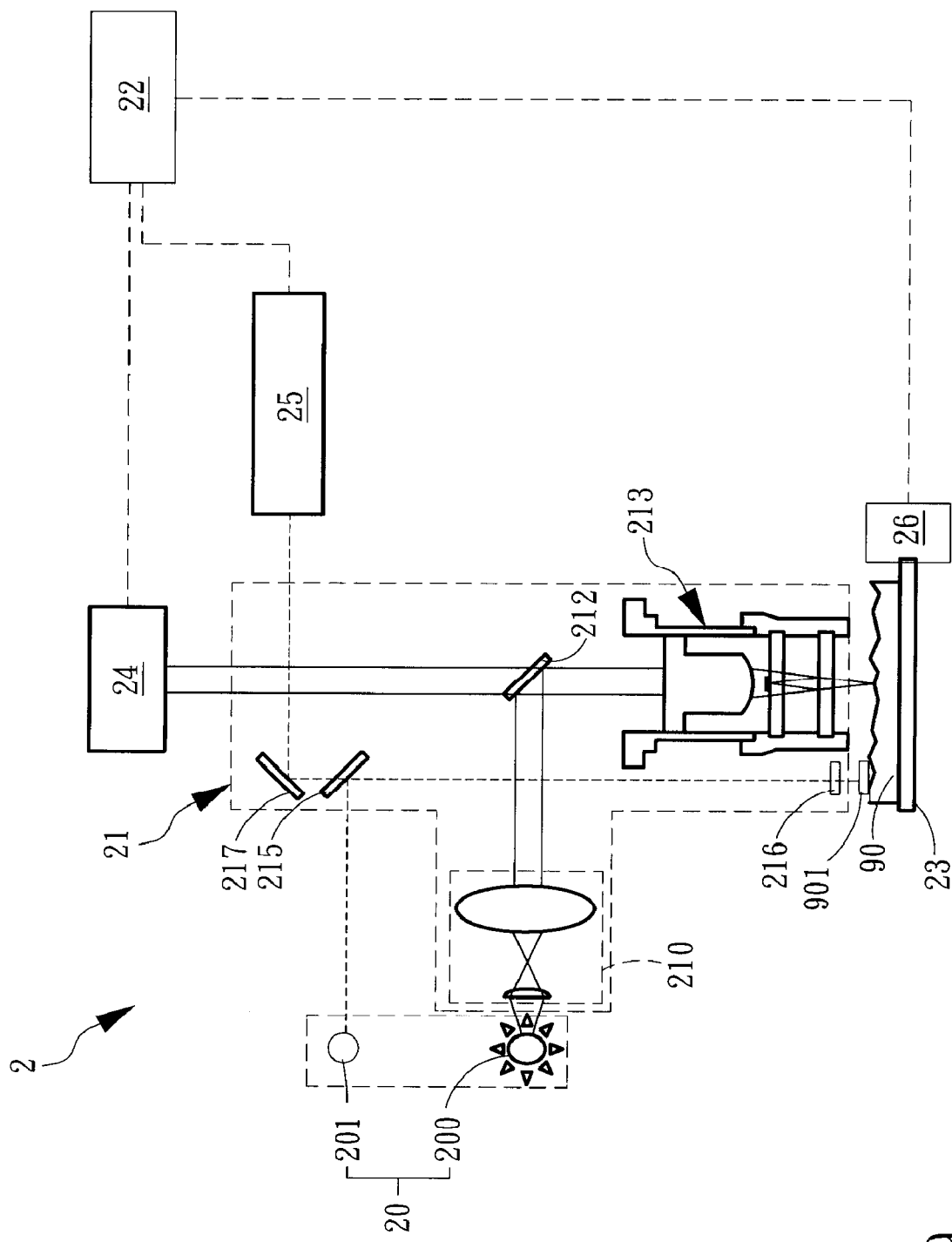
FIG. 9 is a schematic diagram showing a vibration-resistant interferometric scanning system according to a fourth embodiment of the invention.

Please refer to FIG. 9, which is a schematic diagram showing a vibration-resistant interferometric scanning system according to a fourth embodiment of the invention. In this embodiment, the low-coherent interference pattern is formed in a way similar to that in the embodiment shown in FIG. 2A, but the high-coherent interference pattern is formed in a way different from that in the embodiment shown in FIG. 2A. In FIG. 9, the light generated from the high-coherent light source 201 is reflected by a beam splitter 215 so as to be projected on a beam splitter 216 which is mounted on the interferometric objective 213. Then, by the splitting of the beam splitter 216, the light projected on the beam splitter 216 is divided into a reference beam and a transmissive beam, in which the transmissive beam is projected on a reflection mirror 901 mounted on the measured object 90 to be reflected back to the beam splitter 216 to form an object beam. In the beam splitter 216, the reference beam and the object beam are combined to form a high-coherent interference light which passes the beam splitter 216 to be reflected by a reflection mirror 217 to be acquired by a second image-grabbing device 25 to form a high-coherent interference pattern.

Figure 10:
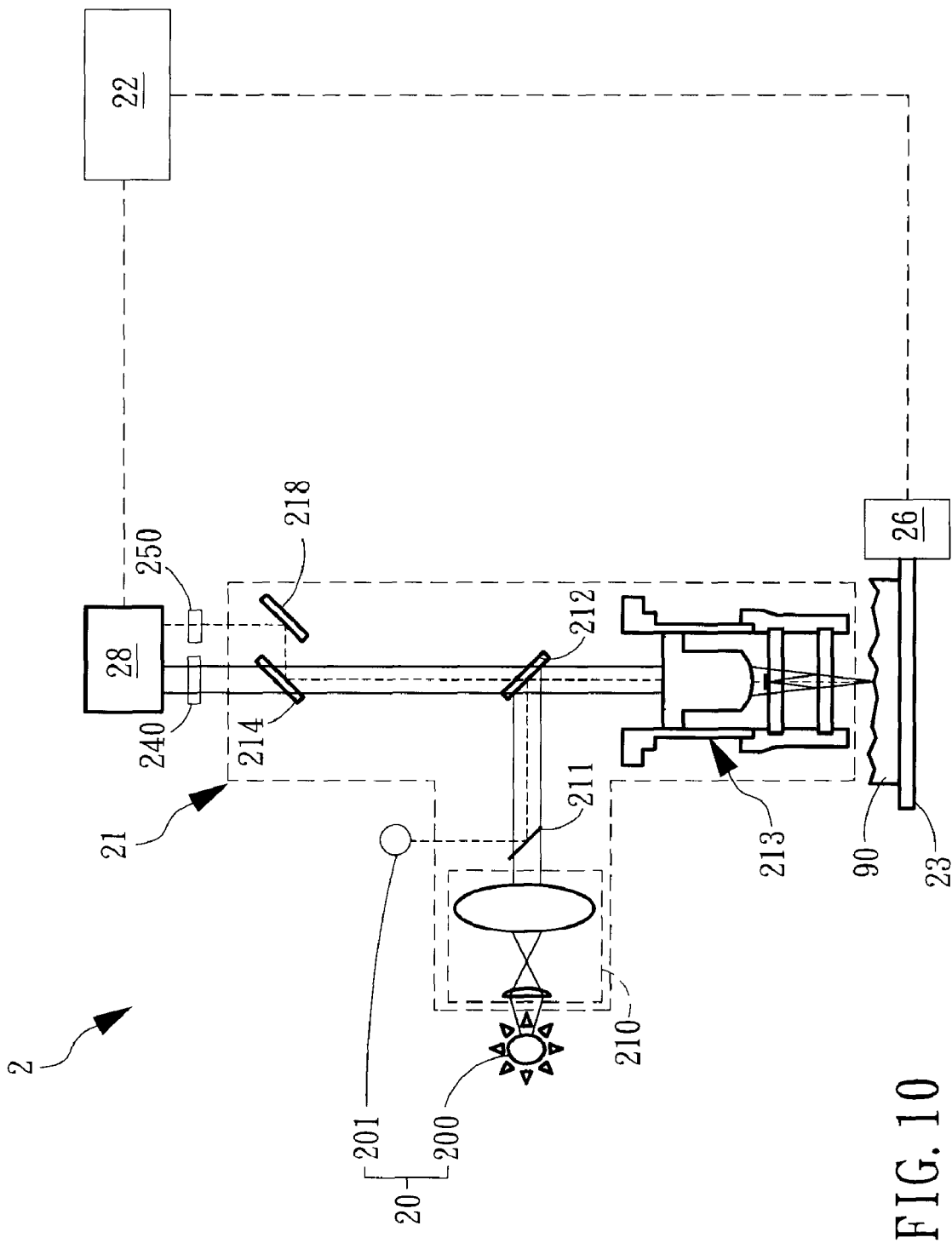
FIG. 10 is a schematic diagram showing a vibration-resistant interferometric scanning system according to a fifth embodiment of the invention.

Although there are two image-grabbing devices 24 and 25 used in the embodiments of FIG. 2A, FIG. 2B, FIG. 8 and FIG. 9, the embodiment shown in FIG. 10 can use only one image-grabbing device 28 for obtaining simultaneously a high-coherent interference pattern and a low-coherent interference pattern if some extra light-guiding optical components, such as a reflection mirror 218, are added.

The following descriptions explain the algorithms for locking the brightness distribution in the high-coherent interference pattern according to the brightness ratio or the position with the local-maximal or local-minimal brightness. Assuming the high-coherent interference pattern is created by an object beam with the intensity of $I_O$ and a reference beam with the intensity of $I_R$, the intensity I of the interference field can be represented as $$I = I_O + I_R + 2\sqrt{I_O I_R} \cos \theta, \tag{1}$$

where $\theta$ represents the phase difference between the high-coherent reference beam and the high-coherent object beam. Thus, the maximal intensity $I_{max}$ and the minimal intensity $I_{min}$ are respectively as $$I_{max} = I_O + I_R + 2\sqrt{I_O I_R} \tag{2a}$$

and $$I_{min\,x} = I_O + I_R - 2\sqrt{I_O I_R}. \tag{2b}$$

Assume $I_O$ and $I_R$ are both constant with respect to time. When the position of the interferometric objective distance is changed (i.e. perform a shifting action) by $\lambda/2$ (corresponding to a phase deviation of 180°) and the position of the objective is unchanged (corresponding to a phase deviation of 0°), the phase difference $\Delta\theta$ between the high-coherent reference beam and the high-coherent object beam is 360° (corresponding to $\lambda$). Therefore, the value of $\cos\theta$ is not changed and the intensity I is unchanged as well. Under this situation with $I_O$ and $I_R$ being both constant, using the ratio of the brightness values of two specified pixels is sufficient for locking the brightness distribution of a high-coherent interference pattern.

Assume $I_O$ or $I_R$ is not constant with respect to time. When the position of the interferometric objective distance is changed by $\lambda/2$ and the position of the objective is unchanged, the phase difference $\Delta\theta$ between the high-coherent reference beam and the high-coherent object beam is 360°. Then, the value of $\cos\theta$ is not changed. Although the local-maximal intensity $I_{max}$ and the local-minimal intensity $I_{min}$ for the sampling path both change (for $I_O$ or $I_R$ being not constant), the positions for the maximal intensity $I_{max}$ and the minimal intensity $I_{min}$ both remain unchanged (for $\cos\theta$ being constant). Therefore, it is confirmed that the brightness distribution remains unchanged before and after the shifting action (although the intensity I doesn't remain unchanged). When the position of the interferometric objective distance is changed by $\lambda/4$ and the position of the objective is unchanged, the phase difference $\Delta\theta$ between the high-coherent reference beam and the high-coherent object beam is 180°. Then, the value of cos θ in Eq. (1) is replaced with −cos θ and the positions for the maximal intensity $I_{max}$ and the minimal intensity $I_{min}$ become the positions for the minimal intensity $I_{min}$ and the maximal intensity $I_{max}$, respectively. Therefore, we can say that the brightness distribution is reversed before and after the shifting action. Under this situation with $I_O$ or $I_R$ being not constant, using the position of the local-brightest or local-darkest pixel among at least three continuous pixels is sufficient for locking the brightness distribution of the high-coherent interference pattern.

Although all the aforesaid embodiments of the invention are illustrated by the use of a Mirau interferometer for using an interference objective, but it is not limited thereby. For example, the Mirau interference objective can be can be replaced by a Michelson interferometer or a Linnik interferometer.

To sum up, the present invention provides a vibration resistant interferometric scanning system and method, which is adapted for performing an accurate surface profile measurement for a measured object disturbed by external or internal vibration sources.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed is:

1. A vibration-resistant interferometric scanning system, comprising:
    a light source module;
    an optics module, for receiving the light from the light source module so as to form a high-coherent interference pattern and a low-coherent interference pattern corresponding to the surface profile of a measured object; and
    a control unit, capable of performing a compensation action to lock the brightness distribution of the high-coherent interference pattern and consequently locking the fringe distribution of the low-coherent interference pattern; or capable of performing plural processes in sequence and every process being performed in a manner that the control unit first performs a shifting action with a specified shifting distance, and then basing upon the specified shifting distance, the wavelength of the light forming the high-coherent interference pattern, and the brightness distribution of the high-coherent interference pattern acquired before the shifting action to perform a compensation action to lock the brightness distribution of the high-coherent interference pattern after the shifting action so that the fringe distribution of the low-coherent interference pattern after the shifting action is locked consequently.

2. The vibration-resistant interferometric scanning system of claim 1, wherein the position of the measured object is controlled by the control unit.

3. The vibration-resistant interferometric scanning system of claim 2, wherein the control unit uses a displacement unit to control the position of the measured object.

4. The vibration-resistant interferometric scanning system of claim 1, wherein the optics module further comprises an objective.

5. The vibration-resistant interferometric scanning system of claim 4, wherein the position of the objective is controlled by the control unit.

6. The vibration-resistant interferometric scanning system of claim 5, wherein the control unit uses a displacement unit to control the position of the objective.

7. The vibration-resistant interferometric scanning system of claim 1, wherein the optics module further comprises an image-grabbing device.

8. The vibration-resistant interferometric scanning system of claim 1, wherein the optics module further comprises two image-grabbing devices.

9. A vibration-resistant interferometric scanning method, comprising:
    forming a high-coherent interference pattern and a low-coherent interference pattern corresponding to the surface profile of a measured object; and
    performing a compensation action to lock the brightness distribution of the high-coherent interference pattern and consequently locking the fringe distribution of the low-coherent interference pattern.

10. The vibration-resistant interferometric scanning method of claim 9, wherein the locking of the brightness distribution of the high-coherent interference pattern is performed according to the brightness ratio between two specified pixels in the high-coherent interference pattern.

11. The vibration-resistant interferometric scanning method of claim 9, wherein the locking of the brightness distribution of the high-coherent interference pattern is performed according to the position of a local-brightest or local-darkest pixel for a specified line that contains at least three continuous pixels in the high-coherent interference pattern.

12. A vibration-resistant interferometric scanning method, comprising:
    forming a high-coherent interference pattern and a low-coherent interference pattern corresponding to the surface profile of a measured object; and
    performing plural processes in sequence and every process being performed according to the steps of:
    performing a shifting action with a specified shifting distance; and
    basing upon the specified shifting distance, the wavelength of the light forming the high-coherent interference pattern, and the brightness distribution of the high-coherent interference pattern acquired before the shifting action to perform a compensation action to lock the brightness distribution of the high-coherent interference pattern after the shifting action so that the fringe distribution of the low-coherent interference pattern after the shifting action is locked consequently.

13. The vibration-resistant interferometric scanning method of claim 12, wherein the brightness distribution of the high-coherent interference pattern remains unchanged before and after the shifting action.

14. The vibration-resistant interferometric scanning method of claim 13, wherein the specified shifting distance is equal to a half wavelength of the light used to form the high-coherent interference pattern.

15. The vibration-resistant interferometric scanning method of claim 12, wherein the brightness distribution of the high-coherent interference pattern before the shifting action is the inverse of that after the shifting action.

16. The vibration-resistant interferometric scanning method of claim 15, wherein the specified shifting distance is a quarter wavelength of the light used to form the high-coherent interference pattern.

17. The vibration-resistant interferometric scanning method of claim 12, wherein the locking of the brightness distribution of the high-coherent interference pattern is performed according to the brightness ratio between two specified pixels in the high-coherent interference pattern.

18. The vibration-resistant interferometric scanning method of claim 12, wherein the locking of the brightness distribution of the high-coherent interference pattern is performed according to the position of a local-brightest or local-darkest pixel for a specified line that contains at least three continuous pixels in the high-coherent interference pattern.

* * * * *